US012647840B2

(12) United States Patent
Selvaraj et al.

(10) Patent No.: US 12,647,840 B2
(45) Date of Patent: Jun. 2, 2026

(54) MOBILITY PROTOCOL FOR NARROW-BAND INTERNET OF THINGS (NB-IoT) NETWORKS

(71) Applicant: Bank of America Corporation, Charlotte, NC (US)

(72) Inventors: Srinivasan Selvaraj, Adambakkam (IN); Prabha Bagavath Singh, Perungudi (IN)

(73) Assignee: Bank of America Corporation, Charlotte, NC (US)

( * ) Notice: Subject to any disclaimer, the term of this patent is extended or adjusted under 35 U.S.C. 154(b) by 455 days.

(21) Appl. No.: 18/106,090

(22) Filed: Feb. 6, 2023

(65) Prior Publication Data

US 2024/0267796 A1     Aug. 8, 2024

(51) Int. Cl.
| | |
|---|---|
| *H04W 24/08* | (2009.01) |
| *H04B 17/309* | (2015.01) |
| *H04L 1/00* | (2006.01) |
| *H04M 1/72448* | (2021.01) |
| *H04W 36/00* | (2009.01) |

(52) U.S. Cl.
CPC ...... *H04W 36/0019* (2023.05); *H04B 17/309* (2015.01); *H04L 1/0061* (2013.01); *H04M 1/72448* (2021.01); *H04W 24/08* (2013.01); *H04W 36/0061* (2013.01)

(58) Field of Classification Search
CPC ............. H04W 36/0019; H04W 24/08; H04W 36/0061; H04B 17/309; H04L 1/0061; H04M 1/72448
See application file for complete search history.

(56) References Cited

U.S. PATENT DOCUMENTS

| | | | |
|---|---|---|---|
| 11,031,999 | B1 | 6/2021 | Liu et al. |
| 11,172,434 | B2 | 11/2021 | Lee et al. |
| 11,424,539 | B2 | 8/2022 | Alpman et al. |
| 11,490,314 | B2 | 11/2022 | Rahman |
| 11,491,557 | B2 | 11/2022 | Niskanen |
| 11,509,654 | B2 | 11/2022 | Schmidt |
| 11,533,719 | B2 | 12/2022 | Dong et al. |
| 11,570,666 | B2 | 1/2023 | Ghadge et al. |
| 11,570,678 | B2 | 1/2023 | Kim et al. |

(Continued)

*Primary Examiner* — Jae Y Lee
*Assistant Examiner* — Nam P. Cao
(74) *Attorney, Agent, or Firm* — Banner & Witcoff, Ltd.

(57)     ABSTRACT

Aspects of the disclosure relate to a mobility protocol for NB-IoT networks. A mobility protocol device may monitor a wireless data connection between the device and a first NB-IoT node. The device may compare a connection strength of the wireless data connection to a threshold value. Based on identifying that the connection strength is below the threshold value, the device may generate a connection transfer request packet. The device may send the connection transfer request packet to one or more NB-IoT nodes based on a preferred connections list. The device may generate, based on receiving a determination result from a second NB-IoT node indicating the second NB-IoT node will accept a connection, an acknowledgment packet. The acknowledgment packet may be configured to establish the connection with the second NB-IoT node. Based on the acknowledgment packet, the device may cause the first NB-IoT node to transfer the wireless data connection to the second NB-IoT node.

20 Claims, 7 Drawing Sheets

(56)       References Cited

U.S. PATENT DOCUMENTS

| | | | |
|---|---|---|---|
| 2021/0007023 A1* | 1/2021 | Umapathy | ........ H04W 36/0061 |
| 2021/0152304 A1* | 5/2021 | Lei | ...................... H04L 27/2605 |
| 2021/0176686 A1 | 6/2021 | Khalid | |
| 2021/0204183 A1 | 7/2021 | Khalid | |
| 2021/0235342 A1* | 7/2021 | Zhu | ...................... H04W 76/27 |
| 2021/0329424 A1 | 10/2021 | Barzuza et al. | |
| 2021/0360680 A1 | 11/2021 | Nam et al. | |
| 2022/0232503 A1 | 7/2022 | Cheng et al. | |
| 2022/0338213 A1 | 10/2022 | Elshafie et al. | |
| 2022/0408411 A1 | 12/2022 | Vivanco et al. | |
| 2022/0416995 A1 | 12/2022 | Blatt et al. | |
| 2023/0030173 A1 | 2/2023 | Ck et al. | |
| 2023/0030570 A1 | 2/2023 | Wild | |
| 2023/0033043 A1 | 2/2023 | Borges et al. | |
| 2023/0033336 A1 | 2/2023 | Awoniyi-Oteri et al. | |
| 2023/0232298 A1* | 7/2023 | Parichehrehteroujeni | ................... H04W 36/0058 370/331 |
| 2023/0337278 A1* | 10/2023 | Wang | ................... H04W 24/10 |
| 2023/0379963 A1* | 11/2023 | Lin | ...................... H04L 5/0053 |
| 2025/0330286 A1* | 10/2025 | Sahin | ...................... H04L 41/16 |

* cited by examiner

102

111

112

113

Mobility Protocol Device

Processor(s)

Memory(s)

Mobility Protocol Module
112a

Mobility Protocol Database
112b

Communication Interface(s)

300

Available Node Interface

Welcome, <User Device Profile>
Alert: NB-IoT connection strength weak
Subject: First NB-IoT node
Available Node: Second NB-IoT node Transfer Connection?

Yes      No

MOBILITY PROTOCOL FOR NARROW-BAND INTERNET OF THINGS (NB-IoT) NETWORKS

BACKGROUND

Aspects of the disclosure relate to mobility protocols for devices on narrow-band internet of things (NB-IoT) networks. In some instances, a device may connect to an NB-IoT node maintained by an NB-IoT network providing wireless network connectivity to an area. In some examples, the strength of a wireless data connection between the device and the NB-IoT node may decrease based on a variety of factors such as distance, load, transmission power, and/or other factors. For example, a user may move out of range of the NB-IoT node while using a mobile device connected to the NB-IoT node. In order to maintain the connection, the NB-IoT network may boost the transmission power of the connection, negating some of the benefits of the NB-IoT network (such as lowering operating costs, low power draw, and/or other benefits). In some instances, boosting the transmission power may maintain the connection, but with a connection strength insufficient for sending information. As a result, packets of information sent from the device to the NB-IoT node may be lost and/or dropped. Accordingly, it may be important to provide an improved mobility protocol to improve the handoff process between NB-IoT nodes to minimize packet loss.

SUMMARY

Aspects of the disclosure provide effective, efficient, scalable, and convenient technical solutions that address and overcome the technical problems associated with current mobility protocols for NB-IoT networks. In accordance with one or more arrangements of the disclosure, a computing device with at least one processor, a communication interface, and memory storing computer-readable instructions may monitor a wireless data connection corresponding to the computing device and a first NB-IoT node. The computing device may determine, based on comparing a connection strength corresponding to the wireless data connection to a threshold value, whether or not the connection strength is below the threshold value. The computing device may generate, based on identifying that the connection strength is below the threshold value, a connection transfer request packet corresponding to real-time information of the computing device. The computing device may send, based on a preferred connections list, the connection transfer request packet to one or more NB-IoT nodes on the preferred connections list. The computing device may generate an acknowledgment packet configured to cause a connection transfer with a second NB-IoT node, based on receiving a determination result indicating the second NB-IoT node will accept the connection transfer. The second NB-IoT node may be one of the one or more NB-IoT nodes. The computing device may cause the first NB-IoT node to transfer the wireless data connection to the second NB-IoT node based on the acknowledgment packet.

In one or more instances, the preferred connection list may comprise a plurality of NB-IoT nodes within range of the computing device. The preferred connection list may further comprise one or more indicators of connection strength corresponding to each of the plurality of NB-IoT nodes and historical connection information corresponding to the computing device and the plurality of NB-IoT nodes. In one or more examples, the connection transfer request packet may comprise a priority bit corresponding to a priority of the computing device, a mobile device address corresponding to the computing device, a cell address, and a cyclic redundancy check field, wherein the cyclic redundancy check field is configured to determine whether or not the connection transfer request packet includes an error. The cell address may be configured to serve as a return address for the determination result.

In one or more instances, the acknowledgment packet may comprise an acknowledgment bit, which may indicate the determination result is a positive determination result. The acknowledgment packet may further comprise a connection establishment request. The connection establishment request may be configured to request the connection with the second NB-IoT network. The acknowledgment packet may further comprise an address corresponding to the second NB-IoT node.

In one or more examples, the computing device may display a user interface based on receiving the determination result from the second NB-IoT node. The user interface may be configured to receive user input indicating whether or not the computing device should connect to the second NB-IoT node. The computing device may update the preferred connections list based on user input indicating the computing device should not connect to the second NB-IoT node. In one or more instances, the computing device may update the preferred connections list based on receiving a determination result indicating the second NB-IoT node 106 will not accept the connection. The computing device may send the connection transfer request packet to one or more NB-IoT nodes on the updated preferred connections list, based on the updated preferred connections list.

In one or more examples, generating the connection transfer request packet may comprise generating a priority bit based on comparing a mobile device address corresponding to the computing device to a priority list maintained by an NB-IoT network. The NB-IoT network may comprise the first NB-IoT node, the second NB-IoT node, and each remaining node of the one or more NB-IoT nodes. Generating the connection transfer request packet may further comprise attaching the priority bit to the front of a packet. The packet may comprise the mobile device address, a cell address, and a cyclic redundancy check. In one or more instances the computing device may modify the preferred connections list. Modifying the preferred connections list may comprise scoring the one or more NB-IoT nodes based on a plurality of factors. The plurality of factors may comprise one or more of: NB-IoT load capacity, current load sizes corresponding to each of the one or more NB-IoT nodes, a proximity of the computing device to each of the one or more NB-IoT nodes, or signal strengths corresponding to each of the one or more NB-IoT nodes. Modifying the preferred connections list may further comprise reordering the one or more NB-IoT nodes for the preferred connections list based on the scoring. In one or more examples, the computing device may be configured to operate on a smart device network with a plurality of smart devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
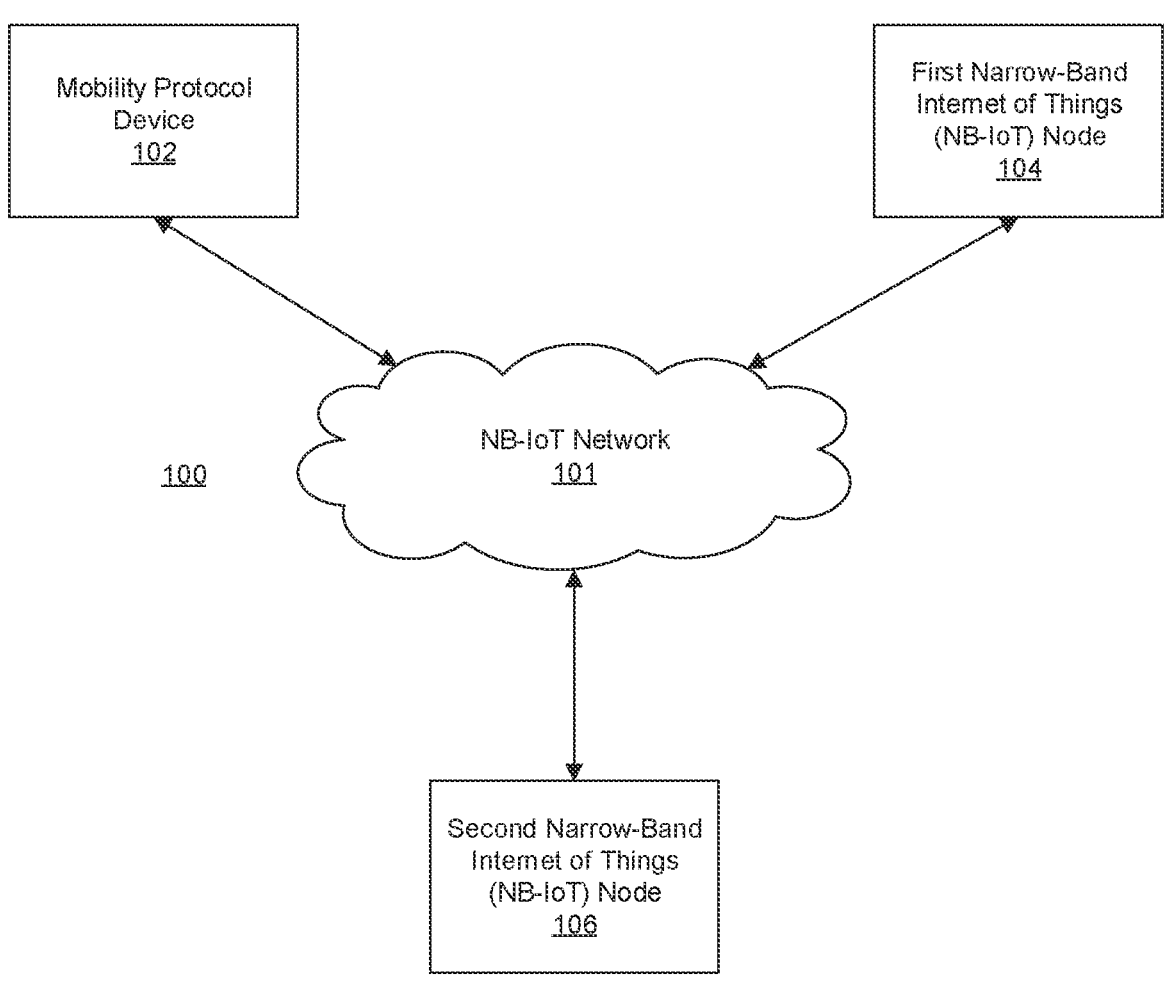
FIGS. 1A-1B depict an illustrative computing environment for a mobility protocol for NB-IoT networks in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a mobility protocol for NB-IoT networks. An enterprise (such as a financial institution, and/or other institutions) may make use of NB-IoT networks to provide wireless data connections to users (e.g., customers of the institution, employees of the institution, and/or other users) for a variety of purposes (e.g., conducting transactions, accessing an account maintained by the institution, and/or other purposes). NB-IoT networks may provide improvements over other networks, such as reducing costs, improving battery life of devices connected to the network, offering a high connection density, and/or other improvements. However, in some instances, users connecting to the NB-IoT network via a mobile device (e.g., a cellular phone, a smart device such as a smart watch and/or other smart devices, and/or other mobile devices) may experience decreases in the strength of the wireless data connection based on a variety of factors, such as distance to the NB-IoT node, the transmission power, and/or other factors. In these instances the NB-IoT node may need to boost the signal strength, expending resources and negating some of the benefits of the NB-IoT network. In some examples, the connection strength may weaken to a point where the wireless data connection remains established but is not strong enough to transfer information sent by the mobile device to the NB-IoT node, which may result in the loss or corruption of the information. Accordingly, it may be beneficial to implement a mobility protocol allowing for efficient transfer of the wireless data connection to another NB-IoT node within the NB-IoT network that may provide greater connection strength between the NB-IoT network and the mobile device.

Institutions may employ the mobility protocol described above via user computing devices (e.g., by installing the mobility protocol on a computing device, such as through a downloadable mobile application and/or other methods). The mobility protocol may include continuously (or near-continuously) monitoring the connection strength of a wireless data connection between the computing device and a first NB-IoT node and comparing that connection strength to a threshold value. In some instances, the connection strength may eventually fall below the threshold value. In these instances, the mobility protocol may include generating a connection transfer request packet configured to broadcast a request for other NB-IoT nodes within range of the computing device to acknowledge that they might accept a connection request from the computing device. In some examples, the mobility protocol may further include first determining a preferred connections list indicating a subset of the NB-IoT nodes within range of the computing device. Accordingly, the mobility protocol may include broadcasting the connection transfer request packet to the NB-IoT nodes included in the preferred connections list. The NB-IoT nodes may determine whether or not they are willing to accept a connection from the computing device. Based on receiving a determination result from at least a second NB-IoT node indicating the second NB-IoT node is willing to accept a connection transfer, the computing device may generate an acknowledgment packet indicating that the second NB-IoT node is willing to accept the connection transfer and indicating that the computing device is requesting a transfer of the wireless data connection from the first NB-IoT node to the second NB-IoT node. In these examples, based on the acknowledgment packet, the computing device may cause the first NB-IoT node to transfer the wireless data connection to the second NB-IoT node.

These and various other aspects will be discussed more fully herein.

Figure 1B:
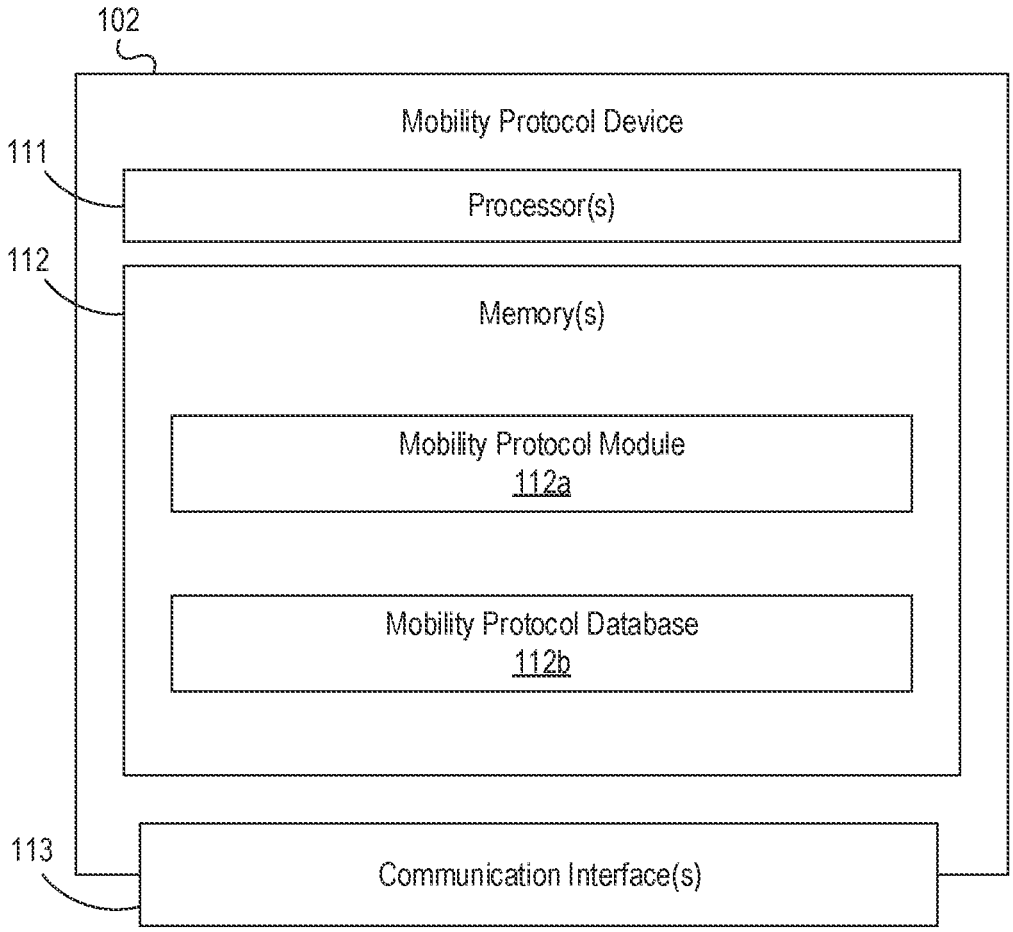

FIGS. 1A-1B depict an illustrative computing environment for a mobility protocol for NB-IoT networks in accordance with one or more example arrangements. Referring to FIG. 1A, computing environment 100 may include one or more computer systems. For example, computing environment 100 may include a mobility protocol device 102, a first NB-IoT node 104, and a second NB-IoT node 106.

As described further below, mobility protocol device 102 may be a computer system that includes one or more computing devices (e.g., laptop computer, desktop computer, mobile device, tablet, smartphone, smartwatch, IoT sensor device (e.g., biometric sensor device, vehicle sensor, and/or other sensors), and/or other devices) and/or other computer components (e.g., processors, memories, communication interfaces) that may be used to implement the mobility protocol. In some examples, the mobility protocol may be installed on and/or otherwise maintained by the mobility protocol device 102. For example, the mobility protocol may be downloaded with and/or otherwise integrated with an application maintained by an enterprise organization (e.g., a mobile banking application of a financial institution, and/or other institutions). In some instances, mobility protocol device 102 may be a user device corresponding to a user (e.g., an employee of the enterprise organization, a client of the enterprise organization, and/or other users). In one or more instances, the mobility protocol device 102 may be configured to communicate with one or more systems (e.g., first NB-IoT node 104, second NB-IoT node 106, and/or other systems) to perform a data transfer, monitor a wireless data connection, and/or other functions. In some examples, the mobility protocol device 102 may be a smart device (e.g. smartphone, smartwatch, an/or other smart devices) configured to operate with other smart devices (e.g., as part of an NB-IoT network). In some instances, the mobility protocol device 102 may be configured to display one or more graphical user interfaces (e.g., available node interfaces, and/or other interfaces).

First NB-IoT node 104 may be and/or otherwise include one or more computing devices (e.g., modems, desktop computers, laptop computers, mobile devices, servers, server blades, and/or other devices) and/or other computer components (e.g., processors, memories, communication interfaces) that may be used to create, host, and/or otherwise control connections to an NB-IoT network. The first NB-IoT node 104 may be accessible by multiple users (who may, e.g., be employees or clients of an enterprise organization such as a financial institution). The first NB-IoT node 104 may be configured to receive information from user devices (such as mobility protocol device 102, and/or other devices) and may be configured to recognize, forward, and/or otherwise process transmissions from the user device to one or more other NB-IoT nodes within the NB-IoT network and/or to a cloud storage system associated with the NB-IoT network. In some instances, the first NB-IoT node 104 may further be configured to check for identification (e.g., an IP address, and/or other identification) before allowing a user device to connect to the first NB-IoT node 104.

Second NB-IoT node 106 may be and/or otherwise include one or more computing devices (e.g., modems, desktop computers, laptop computers, mobile devices, servers, server blades, and/or other devices) and/or other computer components (e.g., processors, memories, communication interfaces) that may be used to create, host, and/or otherwise control connections to an NB-IoT network. The second NB-IoT node 106 may be accessible by multiple users (who may, e.g., be employees or clients of an enterprise organization such as a financial institution). The second NB-IoT node 106 may be configured to receive information from user devices (such as mobility protocol device 102, and/or other devices) and may be configured to recognize, forward, and/or otherwise process transmissions from the user device to one or more other NB-IoT nodes within the NB-IoT network and/or to a cloud storage system associated with the NB-IoT network. In some instances, the second NB-IoT node 106 may further be configured to check for identification (e.g., an IP address, and/or other identification) before allowing a user device to connect to the second NB-IoT node 106.

Although only two NB-IoT nodes are depicted herein, any number of such nodes may be used to implement the methods described herein without departing from the scope of the disclosure.

Computing environment 100 also may include one or more networks, which may interconnect mobility protocol device 102, first NB-IoT node 104, and second NB-IoT node 106. For example, computing environment 100 may include an NB-IoT network 101 (which may interconnect, e.g., mobility protocol device 102, first NB-IoT node 104, and second NB-IoT node 106).

In one or more arrangements, mobility protocol device 102, first NB-IoT node 104, and second NB-IoT node 106 may be any type of computing device capable of sending and/or receiving requests and processing the requests accordingly. For example, first NB-IoT node 104, second NB-IoT node 106, and/or the other systems included in computing environment 100 may, in some instances, be and/or include server computers, desktop computers, laptop computers, tablet computers, smart phones, smart watches, or the like that may include one or more processors, memories, communication interfaces, storage devices, and/or other components. As noted above, and as illustrated in greater detail below, any and/or all of mobility protocol device 102, first NB-IoT node 104, and second NB-IoT node 106, may, in some instances, be special-purpose computing devices configured to perform specific functions.

Referring to FIG. 1B, mobility protocol device 102 may include one or more processors 111, memory 112, and communication interface 113. A data bus may interconnect processor 111, memory 112, and communication interface 113. Communication interface 113 may be a network interface configured to support communication between mobility protocol device 102 and one or more networks (e.g., NB-IoT network 101, or the like). Communication interface 113 may be communicatively coupled to the processor 111. Memory 112 may include one or more program modules having instructions that, when executed by processor 111, cause mobility protocol device 102 to perform one or more functions described herein and/or one or more databases that may store and/or otherwise maintain information which may be used by such program modules and/or processor 111. In some instances, the one or more program modules and/or databases may be stored by and/or maintained in different memory units of mobility protocol device 102 and/or by different computing devices that may form and/or otherwise make up mobility protocol device 102. For example, memory 112 may have, host, store, and/or include mobility protocol module 112*a* and mobility protocol database 112*b*.

Mobility protocol module 112*a* may have instructions that direct and/or cause mobility protocol device 102 to implement the mobility protocol for NB-IoT networks. Mobility protocol database 112*b* may have instructions causing mobility protocol device 102 to store preferred connections lists, available NB-IoT nodes, mobile device addresses, and/or other information (that may, e.g., be used to implement mobility protocols for NB-IoT networks).

Figure 2A:
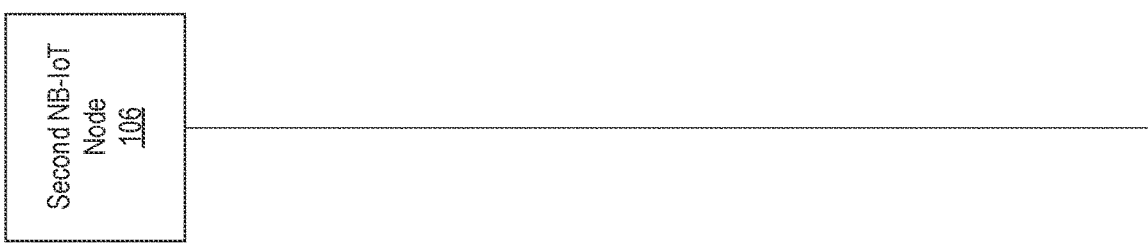
FIGS. 2A-2C depict an illustrative event sequence for a mobility protocol for NB-IoT networks in accordance with one or more example arrangements.
Figure 2A:
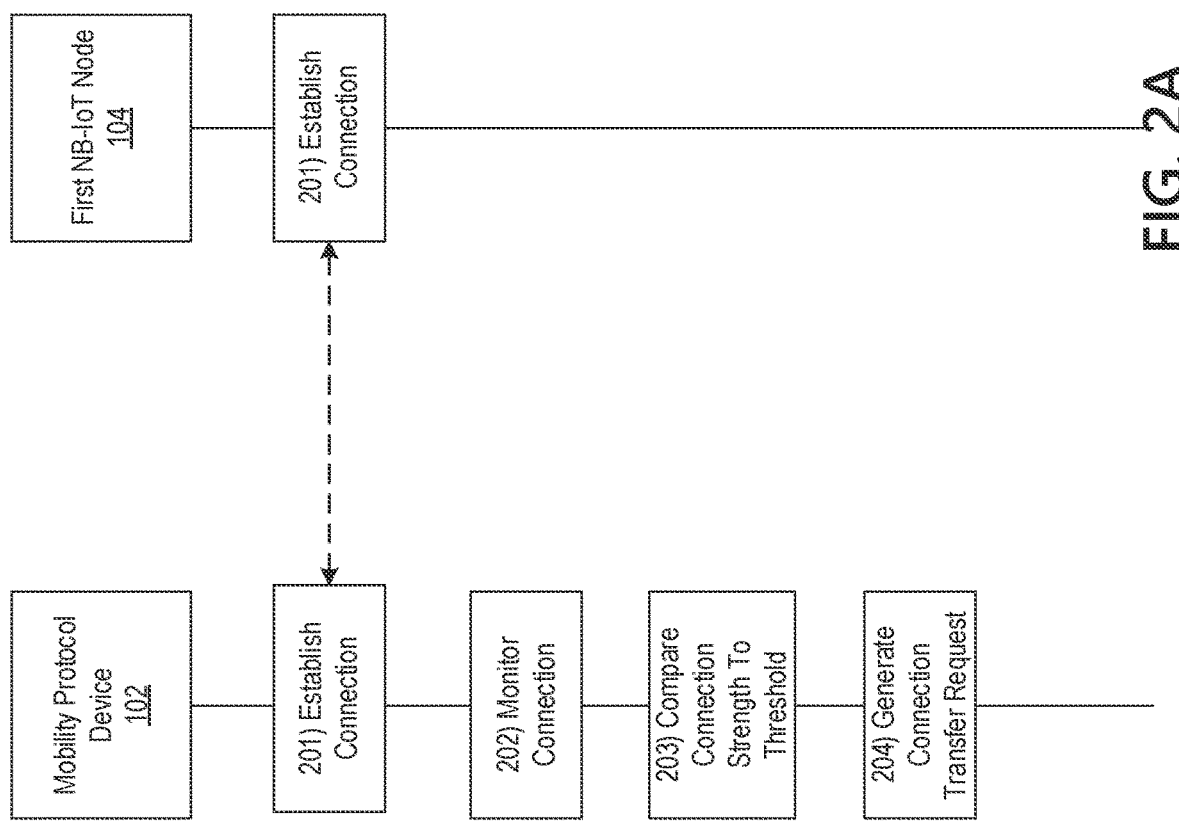
Figure 2B:
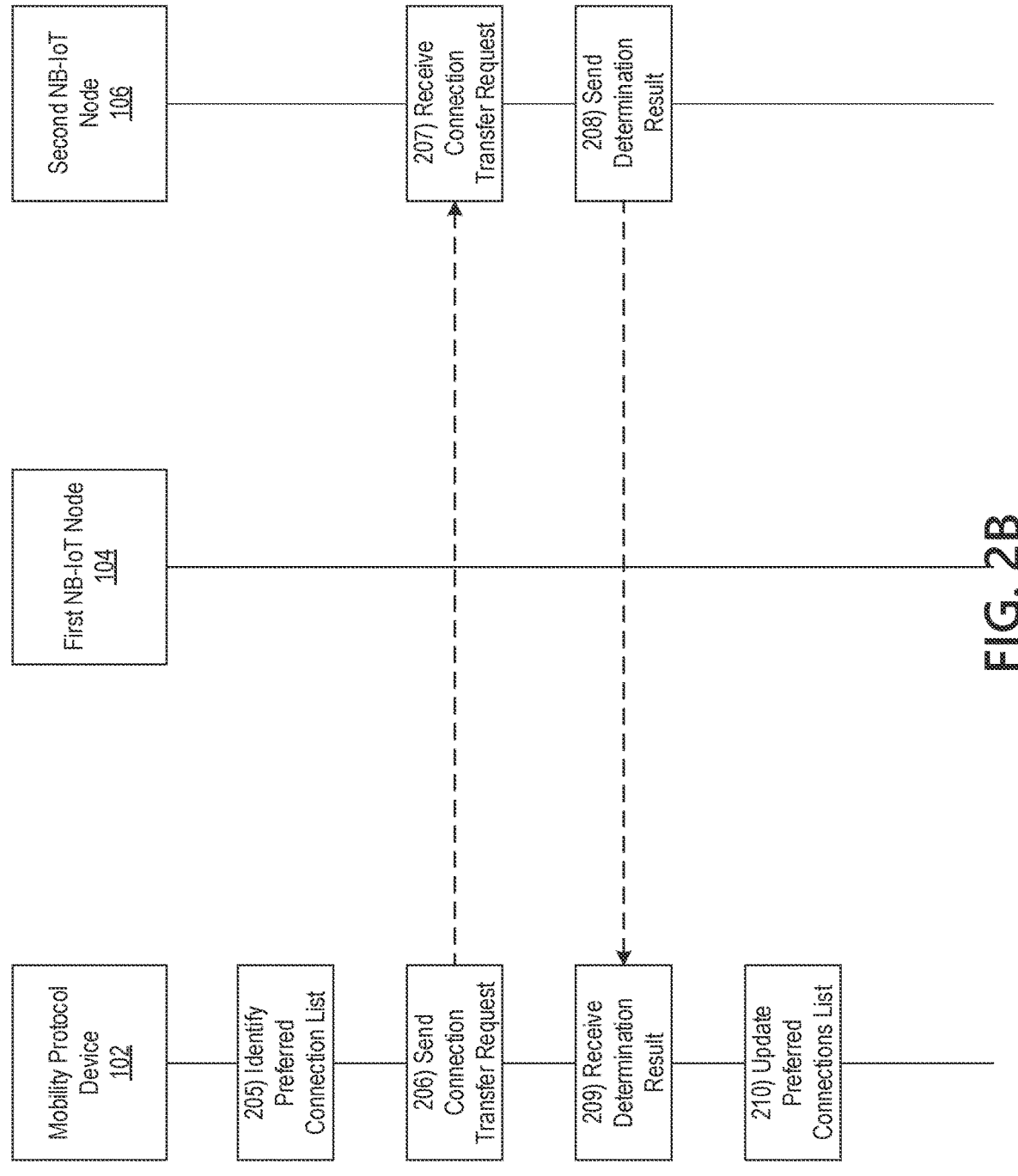
Figure 2C:
Figure 2C:
Figure 2C:
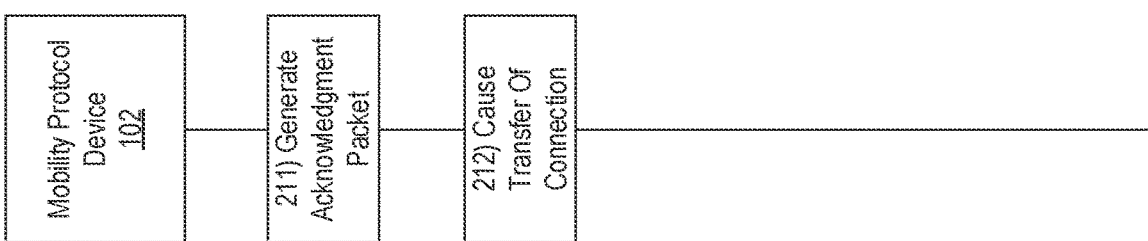

FIGS. 2A-2C depict an illustrative event sequence for mobility protocols for NB-IoT networks in accordance with one or more example arrangements. Referring to FIG. 2A, at step 201, the mobility protocol device 102 may establish a connection with first NB-IoT node 104. For example, mobility protocol device 102 may establish a first wireless data connection with the first NB-IoT node 104 to link the first NB-IoT node 104 with the mobility protocol device 102 (e.g., in preparation for monitoring the first wireless data connection, and/or other functions). In some instances, the mobility protocol device 102 may identify whether or not a connection is already established with the first NB-IoT node 104. If a connection is already established with the first NB-IoT node 104, the mobility protocol device 102 might not re-establish the connection. If a connection is not yet established with the first NB-IoT node 104, the mobility protocol device 102 may establish the first wireless data connection as described above.

At step 202, the mobility protocol device 102 may monitor a wireless data connection (e.g., the first wireless data connection). For example, the mobility protocol device 102 may monitor one or more properties of the wireless data connection corresponding to the strength of the wireless data connection (e.g., a downlink peak rate, an uplink peak rate, a latency, a device transmit power, and/or other properties). The mobility protocol device 102 may monitor the wireless data connection via the communication interface 113 and while the first wireless data connection is established. In some examples, the mobility protocol device 102 may continuously or near-continuously monitor the one or more properties of the wireless data connection. For example, in some instances the mobility protocol device 102 may continuously or near-continuously gather information of changes in values corresponding to any of the one or more properties. In some examples, the mobility protocol device 102 may store the information of changes in values corresponding to any of the one or more properties in internal memory of the mobility protocol device 102, and/or external memory.

At step 203, in monitoring the wireless data connection, the mobility protocol device 102 may identify a connection strength based on the one or more properties of the wireless data connection. For example, the connection strength may be a numerical value corresponding to one of the one or more properties of the wireless data connection (e.g., a value in decibel milliwatts corresponding to the transmit power of the first NB-IoT node 104, and/or other values). In identifying the connection strength, the mobility protocol device 102 may compare the connection strength to a threshold value. For example, the threshold value may indicate a minimum acceptable and/or expected connection strength and may correspond to one of the one or more properties of the wireless data connection (e.g., the threshold value may be value in decibel milliwatts corresponding to the transmit power of a device, such as first NB-IoT node 104, and/or other values). In comparing the connection strength to the threshold value, the mobility protocol device 102 may determine whether or not the connection strength is below the threshold value. Based on a determination that the connection strength is greater than or equal to the threshold value, the mobility protocol device 102 may continue to monitor the wireless data connection as described above at step 202 (e.g., as the mobility protocol device 102 may identify that the connection strength is sufficient in these instances). Based on a determination that the connection strength is below the threshold value (and thus the connection strength is insufficient), the mobility protocol device 102 may generate a connection transfer request packet, as described below at step 204.

At step 204, the mobility protocol device 102 may generate a connection transfer request packet. The connection transfer request packet may correspond to real-time information of the mobility protocol device 102. For example, the connection transfer request packet may be embedded in an information stream of real-time information transmitted from the mobility protocol device 102 to the first NB-IoT node 104. Additionally or alternatively, the connection transfer request packet may be configured to request reception of the real-time information of mobility protocol device 102 in the event the wireless data connection is transferred (e.g., from first NB-IoT node 104 to second NB-IoT node 106).

In some examples, the connection transfer request packet may be and/or include a string of bits. In these examples, the connection transfer request packet may be and/or otherwise include a priority bit, a device address (e.g., a mobile device address) corresponding to the mobility protocol device 102, a cell address, and a cyclic redundancy check (CRC) field. The priority bit may correspond to a priority of the mobility protocol device 102. For example, the mobility protocol device 102 may correspond to a priority based on a variety of factors such as the type of information being sent via the wireless data connection, an account (e.g., a financial account associated with an enterprise organization, and/or other accounts) associated with a user of the mobility protocol device 102 (e.g., an employee of an enterprise organization such as a financial institution, and/or other institutions, a client of the enterprise organization, and/or other users), and/or other factors. The priority may be stored in internal memory of the mobility protocol device 102, and/or external memory. In some examples, the priority may be maintained and/or otherwise determined by the NB-IoT network (e.g., NB-IoT network 101). For example, the NB-IoT network may maintain a priority list that includes a list of devices, including the mobility protocol device 102, and a priority ranking corresponding to each device of the list of devices. For example, the NB-IoT network may maintain a priority list indicating the mobility protocol device 102 is ranked 32nd in priority out of 100 mobile devices.

In some instances, in generating the connection transfer request packet, the mobility protocol device 102 may also generate the priority bit based on comparing a mobile device address corresponding to the computing device to a priority list (e.g., the priority list maintained by the NB-IoT network 101). In these instances, in generating the connection transfer request packet, the mobility protocol device 102 may attach the priority bit to the front of a packet. The packet may comprise the mobile device address, the cell address, and the CRC field.

The cell address may be configured to serve as a return address for a determination result (e.g., the determination result described at step 208 below, and/or other determination results). For example, the cell address may include one or more bits configured to identify an NB-IoT node (e.g., second NB-IoT node 106) that may receive the connection transfer request packet and may, based on receiving the connection transfer request packet, send a determination result to the mobility protocol device 102 (e.g., as described below at step 208). The CRC field may be configured to determine whether or not the connection transfer request packet includes an error. For example, the CRC field may receive a check value (e.g., a value generated based on the remainder of a polynomial division of the connection transfer request packet's contents) from an error-detecting code (e.g., a CRC) implemented by the NB-IoT network 101. The check value may be compared to a second check value generated at a later point in time. If the check value and the second check value do not match, the comparison may indicate a change in the connection transfer request packet occurred. Based on the indication, the mobility protocol device 102 may generate a new connection transfer request packet using the methods described herein.

Referring to FIG. 2B, at step 205, the mobility protocol device 102 may identify a preferred connections list. The preferred connections list may indicate an order of preference, associated with the mobility protocol device 102, for connecting to a plurality of NB-IoT nodes (e.g., second NB-IoT node 106, and/or other NB-IoT nodes). In some instances, in identifying the preferred connections list, the mobility protocol device 102 may review historical connection information corresponding to the mobility protocol device 102 and a plurality of NB-IoT nodes (e.g., second NB-IoT node 106, and/or other NB-IoT nodes). For example, the historical connection information (which may, e.g., be stored in internal memory of the mobility protocol device 102, and/or external memory) may indicate that the mobility protocol device 102 has previously established wireless data connections with three distinct NB-IoT nodes of an NB-IoT network (e.g., NB-IoT network 101). Accordingly, the mobility protocol device 102 may identify a preferred connections list including the three distinct NB-IoT nodes. Additionally or alternatively, in some examples, in identifying the preferred connections list, the mobility protocol device 102 may identify one or more indicators of connection strength corresponding to each of the plurality of NB-IoT nodes (e.g., a downlink peak rate, an uplink peak rate, a latency, a device transmit power, a proximity to the mobility protocol device 102, a current load, and/or other indicators of connection strength). For example, the mobility protocol device 102 may identify a value in decibel-milli-meters corresponding to the connection strength of each of the plurality of NB-IoT nodes. Accordingly, the mobility protocol device 102 may identify a preferred connections list that lists the plurality of NB-IoT nodes based on their indicators of connection strength in descending order.

The preferred connections list identified by the mobility protocol device 102 may include a plurality of NB-IoT nodes within a connection range of the mobility protocol device 102. In some instances, the preferred connections list may further include the one or more indicators of connection strength corresponding to each of the plurality of NB-IoT nodes used to identify the preferred connections list, as described above. Additionally or alternatively, in some instances, the preferred connections list may further include the historical connection information corresponding to the mobility protocol device 102 and the plurality of NB-IoT nodes used to identify the preferred connections list, as described above.

In some instances, the mobility protocol device 102 may continuously or near-continuously modify the preferred connections list based on information of the NB-IoT network 101 and/or a plurality of NB-IoT nodes (e.g., first NB-IoT node 104, second NB-IoT node 106, and/or other NB-IoT nodes). In modifying the preferred connections list, the mobility protocol device 102 may score one or more NB-IoT nodes of the plurality of NB-IoT nodes based on a plurality of factors, such as the load capacity of each of the one or more NB-IoT nodes, the current load size of each of the one or more NB-IoT nodes, signal strengths corresponding to each of the one or more NB-IoT nodes (which may, e.g., be and/or include the transmission power of the one or more NB-IoT nodes and which may indicate the potential strength of a wireless data connection between mobility protocol device 102 and each of the one or more NB-IoT nodes), a proximity of the mobility protocol device 102 to each of the one or more NB-IoT nodes, an indication of a direction of travel of the mobility protocol device 102 (e.g., information indicating the mobility protocol device 102 is a mobile device moving away from a particular NB-IoT node of the one or more NB-IoT nodes), and/or other factors. For example, the mobility protocol device 102 may score an NB-IoT node corresponding to a signal strength of −30 decibel millimeters (dBm) with a value of 10, while the mobility protocol device 102 may score an NB-IoT node corresponding to a signal strength of −67 dBm with a value of 5. Based on the scoring, the mobility protocol device 102 may reorder the one or more NB-IoT nodes for the preferred connections list. For example, the mobility protocol device 102 may reorder the preferred connections list such that the NB-IoT node scored with a value of 10 precedes the NB-IoT node scored with a value of 5 within the preferred connections list.

At step 206, the mobility protocol device 102 may send the connection transfer request packet to one or more NB-IoT nodes. In sending the connection transfer request packet, the mobility protocol device 102 may broadcast and/or otherwise send the connection transfer request packet via the NB-IoT network of first NB-IoT node 104 (e.g., the NB-IoT network 101) to one or more NB-IoT nodes within a broadcasting range of the mobility protocol device 102. For example, the mobility protocol device 102 may send the connection transfer request packet as part of the real-time information stream of the mobility protocol device 102. For instance, the mobility protocol device 102 may embed the connection transfer request packet in the real-time information stream sent to first NB-IoT node 104 via the communication interface 113 and while the first wireless data connection is established. In these examples, the first NB-IoT node 104 may broadcast and/or otherwise send the connection transfer request packet to the one or more NB-IoT nodes (e.g., second NB-IoT node 106) via the NB-IoT network (e.g., NB-IoT network 101). In some instances, the mobility protocol device 102 may only send the connection transfer request packet to one or more NB-IoT nodes included in the preferred connections list. For example, the mobility protocol device 102 may detect five NB-IoT nodes capable of connecting to the mobility proto-col device 102. Three of the five NB-IoT nodes may be included in the preferred connections list. In this example, the mobility protocol device 102 may send (e.g., by broad-casting through the first NB-IoT node, and/or by other methods) the connection transfer request packet to the three NB-IoT nodes included in the preferred connections list, but not to the two NB-IoT nodes not included in the preferred connections list.

At step 207, based on the mobility protocol device 102 sending the connection transfer request packet, one or more NB-IoT nodes may receive the connection transfer request packet. For example, the second NB-IoT node 106 may receive the connection transfer request packet (e.g., by receiving a broadcast on the NB-IoT network 101, and/or by other methods). Based on receiving the connection transfer request packet, the second NB-IoT node 106 may determine whether or not it will accept a connection with the mobility protocol device 102. The second NB-IoT node 106 may generate a determination result indicating whether or not it will accept the connection with the mobility protocol device 102. For example, the second NB-IoT node 106 may gen-erate the determination result based on one or more factors, such as the load capacity of the second NB-IoT node 106, the current load size of the second NB-IoT node 106, a signal strength of the second NB-IoT node 106 (which may, e.g., be and/or include the transmission power of the second NB-IoT node 106 and which may indicate the potential strength of a wireless data connection between mobility protocol device 102 and second NB-IoT node 106), a proximity of the mobility protocol device 102 to the second NB-IoT node 106, an indication of a direction of travel of the mobility protocol device 102 (e.g., information indicating the mobility protocol device 102 is a mobile device moving away from the second NB-IoT node 106), and/or other factors. For instance, the second NB-IoT node 106 may generate a determination result indicating the second NB-IoT node 106 will accept a connection with the mobility protocol device 102 because the signal strength of second NB-IoT node 106 exceeds a threshold value (e.g., the threshold value described above at step 203).

At step 208, the second NB-IoT node 106 may send the determination result to mobility protocol device 102. In sending the determination result to mobility protocol device 102, the second NB-IoT node 106 may first send the determination result to the first NB-IoT node 104 (e.g., via the NB-IoT network 101). Sending the determination result to the first NB-IoT node 104 may cause the first NB-IoT node 104 to send the determination result to the mobility protocol device 102. For example, the first NB-IoT node 104 may send the determination result via the communication interface 113 and while the first wireless data connection is established.

At step 209, the mobility protocol device 102 may receive the determination result. The mobility protocol device 102 may receive the determination result from the first NB-IoT node 104 (e.g., based on the second NB-IoT node 106 first sending the determination result to the first NB-IoT node 104) via the communication interface 113 and while the first wireless data connection is established. In some examples, based on receiving the determination result, the mobility protocol device 102 may identify whether the determination result is a positive determination result (e.g., a determination result indicating the second NB-IoT node 106 will accept the connection from the mobility protocol device 102) or a negative determination result (e.g., a determination result indicating the second NB-IoT node 106 will not accept the connection from the mobility protocol device 102). Based on identifying a positive determination result, the mobility protocol device 102 may automatically proceed to step 211 and generate an acknowledgment packet as described below. Based on identifying a negative determination result, the mobility protocol device 102 may automatically proceed to step 210 and update the preferred connections list as described below.

Figure 3:
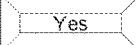
FIG. 3 depicts an illustrative graphical user interface depicting a mobility protocol for NB-IoT networks in accordance with one or more example arrangements.
Figure 3:
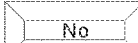

Alternatively, in some instances, based on receiving the determination result, the mobility protocol device 102 may display a user interface to a user. For example, the mobility protocol device 102 may display a graphical user interface similar to available node interface 300, which is illustrated in FIG. 3. Referring to FIG. 3, in some instances, the available node interface 300 may include information corresponding to transferring a wireless data connection between NB-IoT nodes. For example, the available node interface 300 may include information such as a notification that the connection strength of a wireless data connection (e.g., the first wireless data connection) is weak, and identification of the NB-IoT node associated with the wireless data connection (e.g., first NB-IoT node 104), an identification of one or more available NB-IoT nodes (e.g., second NB-IoT node 106, and/or other nodes) that may, e.g., have sent a determination result indicating the one or more available NB-IoT nodes will accept a connection with the mobility protocol device 102, and/or other information.

In some examples, the available node interface 300 may also display interface elements or selectable options requesting user input. For example, the available node interface 300 may display one or more of: a button or buttons, toggle or toggles, check box or boxes, and/or other interface elements. For example, as illustrated in FIG. 3, the interface elements may be buttons the user can select to decide whether or not to transfer a connection. In some instances, based on user input directing the mobility protocol device 102 to transfer a connection, the mobility protocol device 102 may proceed to step 211 and generate an acknowledgment packet as described below. Based on user input directing the mobility protocol device 102 not to transfer a connection, the mobility protocol device 102 may proceed to step 210 and update the preferred connections list as described below.

Referring back to FIG. 2B, at step 210, based on or in response to receiving a negative determination result and/or based on or in response to receiving user input directing the mobility protocol device 102 not to transfer a connection, the mobility protocol device 102 may update the preferred connections list. For example, the mobility protocol device 102 may remove the second NB-IoT node 106 from the preferred connections list based on the negative determination result and/or the user input. Based on or in response to updating the preferred connections list, the mobility protocol device 102 may send the advertisement to one or more NB-IoT nodes based on the updated preferred connections list (e.g., by repeating the steps described above at step 206-209).

Referring to FIG. 2C, at step 211, based on or in response to receiving a positive determination result and/or based on or in response to receiving user input directing the mobility protocol device 102 to transfer a connection, the mobility protocol device 102 may generate an acknowledgment packet. The acknowledgment packet may be and/or include a grouping of bits of information. In generating the acknowledgment packet, the mobility protocol device 102 may generate an acknowledgment bit. The acknowledgment bit may indicate that the determination result was a positive determination result. For example, the acknowledgment bit may be and/or include a binary value of 1, indicating that the determination result was a positive determination result. The acknowledgment packet may include the acknowledgment bit, and may further include a connection establishment request. The connection establishment request may be and/or include a series of bits configured to request the connection with an NB-IoT node (e.g., second NB-IoT node 106). The acknowledgment request may further include a digital address corresponding to the NB-IoT node (e.g., second NB-IoT node 106).

At step 212, the mobility protocol device 102 may cause the transfer of a wireless data connection (e.g., the first wireless data connection). In causing the transfer of the wireless data connection, the mobility protocol device 102 may send the acknowledgement packet instructing the first NB-IoT node 104 to transfer the wireless data connection to the first NB-IoT node 104 (e.g., via the communication interface 113 and while the first wireless data connection is established). Sending the acknowledgment packet may cause the first NB-IoT node 104 to transfer the wireless data connection to the second NB-IoT node 106. For example, the first NB-IoT node 104 may process the acknowledgment packet using packet processing. In processing the acknowledgement packet, the first NB-IoT node 104 may identify that the acknowledgment bit indicates the determination result was a positive determination result and may, based on the connection establishment request and the digital address corresponding to the second NB-IoT node 106, transfer the wireless data connection to the second NB-IoT node 106. In transferring the wireless data connection, the first NB-IoT node 104 may cause the wireless data connection to be established between the mobility protocol device 102 and the second NB-IoT node 106. Based on the transfer of the wireless data connection, the mobility protocol device 102 may monitor the transferred wireless data connection and continuously repeat the steps described above at step 202-212. In doing so, the system and methods described herein may provide improved management of wireless data connections. For example, the systems and methods described herein may provide dynamic management of connections to these nodes responsive to changes in connection strength, which may, e.g., prevent data loss and optimize connection strength.

Figure 4:
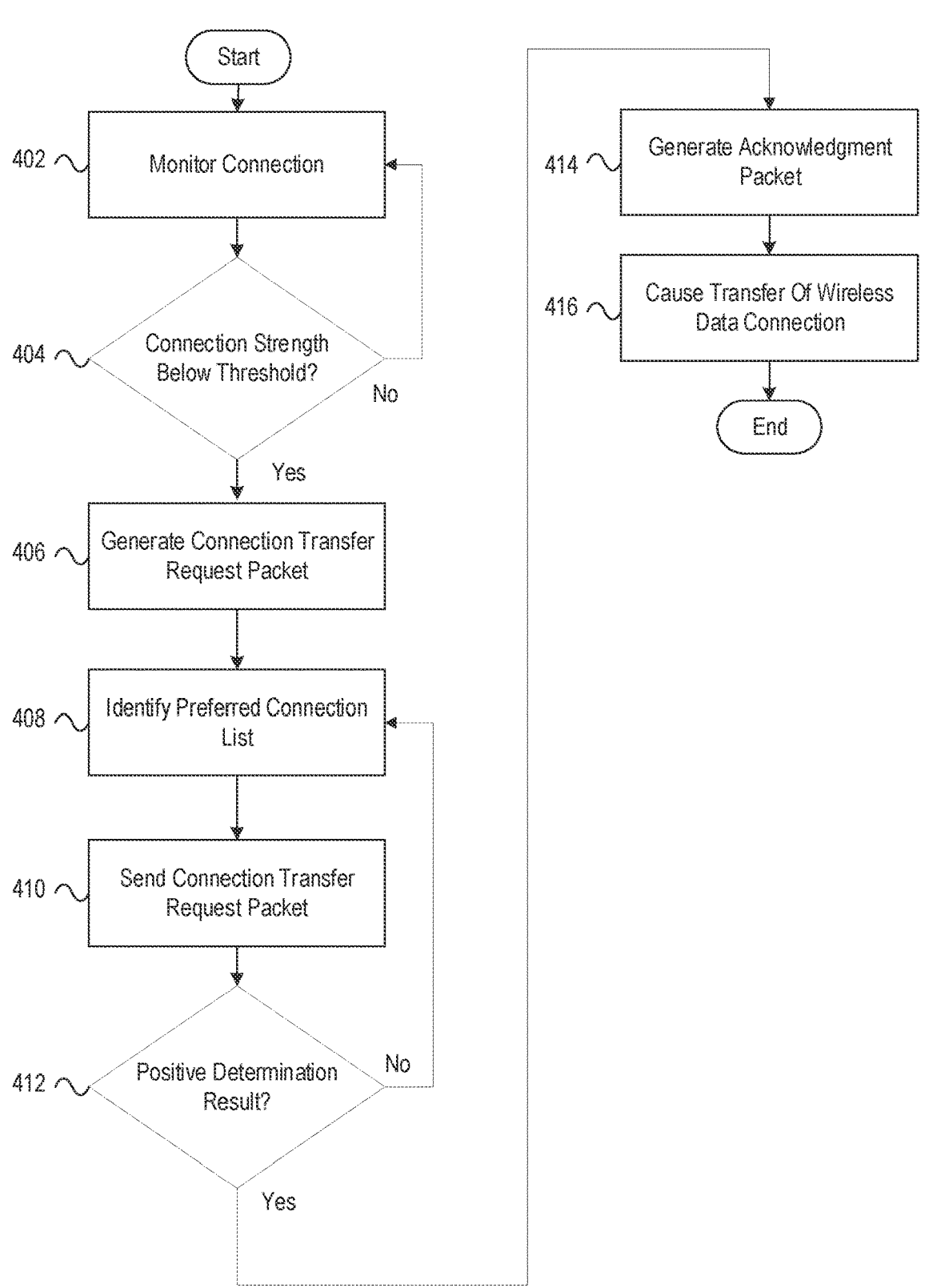
FIG. 4 depicts an illustrative method for a mobility protocol for NB-IoT networks in accordance with one or more example arrangements.

FIG. 4 depicts an illustrative method for mobility protocols for NB-IoT networks in accordance with one or more aspects described herein. Referring to FIG. 4, at step 402, a computing device having at least one processor, a communication interface, and memory may monitor a wireless data connection. At step 404, the computing device may determine whether the connection strength of the wireless data connection is below a threshold value. Based on identifying that the connection strength is not below the threshold value, the computing device may return to step 402 and continue monitoring the wireless data connection. Based on identifying that the connection strength is below the threshold value, the computing device may progress to step 406. At step 406, the computing device may generate a connection transfer request packet. At step 408, the computing device may identify a preferred connections list of NB-IoT nodes. At step 410, the computing device may send the connection transfer request packet to one or more NB-IoT nodes on the preferred connections list.

At step 412, the computing device may identify whether or not the computing device received a positive determination result from an NB-IoT node. Based on identifying that the computing device did not receive a positive determination result, the computing device may return to step 408 and update the preferred connections list. Based on identifying that the computing device did receive a positive determination result, the computing device may progress to step 414. At step 414, the computing device may generate an acknowledgment packet based on the positive determination result. At step 416, the computing device may cause transfer of the wireless data connection.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device comprising:

at least one processor;

a communication interface communicatively coupled to the at least one processor; and memory storing computer-readable instructions that, when executed by the at least one processor, cause the computing device to:

monitor a wireless data connection corresponding to the computing device and a first narrow-band internet of things (NB-IoT) node;

generate, based on historical connection information of the computing device, a preferred connections list comprising one or more NB-IoT nodes;

update, while the wireless data connection is established, the preferred connections list by:

scoring each NB-IoT node of the one or more NB-IoT nodes, wherein the scoring is based on a direction of travel of the computing device;

modifying, based on the scoring, an order of priority of the one or more NB-IoT nodes; and repeating the scoring and the modifying the order of priority periodically while the wireless data connection is established;

determine, based on comparing a connection strength corresponding to the wireless data connection to a threshold value, whether or not the connection strength is below the threshold value;

generate, based on identifying that the connection strength is below the threshold value, a connection transfer request packet corresponding to real-time information of the computing device;

send, based on the preferred connections list, the connection transfer request packet to the one or more NB-IoT nodes on the preferred connections list;

receive, based on sending the connection transfer request packet, a determination result from a second NB-IoT node of the one or more NB-IoT nodes, and in response:

if the determination result indicates that the second NB-IoT node will accept a connection transfer:

generate, an acknowledgment packet configured to cause the connection transfer with the second NB-IoT node; and cause, based on the acknowledgment packet, the first NB-IoT node to transfer the wireless data connection to the second NB-IoT node, or if the determination result indicates that the second NB-IoT node will not accept the connection trans-fer:

update the preferred connections list by removing the second NB-IoT node from the preferred connections list; and send, after updating the preferred connections list by removing the second NB-IoT node and to one or more NB-IoT nodes on the updated preferred connections list, a second connection transfer request packet.

2. The computing device of claim 1, wherein the preferred connections list comprises:

a plurality of NB-IoT nodes within range of the comput-ing device;

one or more indicators of connection strength correspond-ing to each of the plurality of NB-IoT nodes; and historical connection information corresponding to the computing device and the plurality of NB-IoT nodes.

3. The computing device of claim 1, wherein the connec-tion transfer request packet comprises:

a priority bit corresponding to a priority of the computing device;

a mobile device address corresponding to the computing device;

a cell address, wherein the cell address is configured to serve as a return address for the determination result; and a cyclic redundancy check field, wherein the cyclic redun-dancy check field is configured to determine whether or not the connection transfer request packet includes an error.

4. The computing device of claim 1, wherein the acknowl-edgment packet comprises:

an acknowledgment bit, wherein the acknowledgment bit indicates the determination result is a positive deter-mination result;

a connection establishment request, wherein the connec-tion establishment request is configured to request the connection with the second NB-IoT node; and an address corresponding to the second NB-IoT node.

5. The computing device of claim 1, wherein the memory stores additional computer-readable instructions that, when executed by the at least one processor, cause the computing device to:

based on receiving the determination result from the second NB-IoT node, display a user interface, wherein the user interface is configured to receive user input indicating whether or not the computing device should connect to the second NB-IoT node; and based on user input indicating the computing device should not connect to the second NB-IoT node, update the preferred connections list.

6. The computing device of claim 1, wherein generating the connection transfer request packet comprises:

generating a priority bit based on comparing a mobile device address corresponding to the computing device to a priority list maintained by an NB-IoT network, wherein the NB-IoT network comprises the first NB-IoT node, the second NB-IoT node, and each remaining node of the one or more NB-IoT nodes; and attaching the priority bit to a front of a packet, wherein the packet comprises the mobile device address, a cell address, and a cyclic redundancy check field.

7. The computing device of claim 1, wherein the com-puting device is configured to operate on a smart device network with a plurality of smart devices.

8. A method comprising:

at a computing device comprising at least one processor, a communication interface, and memory:

monitoring a wireless data connection corresponding to the computing device and a first narrow-band inter-net of things (NB-IoT) node;

generating, based on historical connection information of the computing device, a preferred connections list comprising one or more NB-IoT nodes;

updating, while the wireless data connection is estab-lished, the preferred connections list by:

scoring each NB-IoT node of the one or more NB-IoT nodes, wherein the scoring is based on a direction of travel of the computing device;

modifying, based on the scoring, an order of priority of the one or more NB-IoT nodes; and repeating the scoring and the modifying the order of priority periodically while the wireless data con-nection is established;

determining, based on comparing a connection strength corresponding to the wireless data connection to a threshold value, whether or not the connection strength is below the threshold value;

generating, based on identifying that the connection strength is below the threshold value, a connection transfer request packet corresponding to real-time information of the computing device;

sending, based on a preferred connections list, the connection transfer request packet to one or more NB-IoT nodes on the preferred connections list;

receiving, based on sending the connection transfer request packet, a determination result from a second NB-IoT node of the one or more NB-IoT nodes, and in response:

if the determination result indicates that the second NB-IoT node will accept a connection transfer:

generating an acknowledgment packet configured to cause the connection transfer with the second NB-IoT node; and causing, based on the acknowledgment packet, the first NB-IoT node to transfer the wireless data connection to the second NB-IoT node, or if the determination result indicates that the second NB-IoT node will not accept the connection trans-fer:

updating the preferred connections list by remov-ing the second NB-IoT node from the preferred connections list; and sending, after updating the preferred connections list and to one or more NB-IoT nodes on the updated preferred connections list, a second connection transfer request packet.

9. The method of claim 8, wherein the preferred connec-tions list comprises:

a plurality of NB-IoT nodes within range of the comput-ing device;

one or more indicators of signal strength corresponding to each of the plurality of NB-IoT nodes; and historical connection information corresponding to the computing device and the plurality of NB-IoT nodes.

10. The method of claim 8, wherein the connection transfer request packet comprises:

a priority bit corresponding to a priority of the computing device;

a mobile device address corresponding to the computing device;

a cell address, wherein the cell address is configured to serve as a return address for the determination result; and a cyclic redundancy check field, wherein the cyclic redundancy check field is configured to determine whether or not the connection transfer request packet includes an error.

11. The method of claim 8, wherein the acknowledgment packet comprises:

an Acknowledgment bit, wherein the Acknowledgment bit indicates the determination result is a positive determination result;

a connection establishment request, wherein the connection establishment request is configured to request the connection with the second NB-IoT node; and an address corresponding to the second NB-IoT node.

12. The method of claim 8, wherein generating the connection transfer request packet comprises:

generating a priority bit based on comparing a mobile device address corresponding to the computing device to a priority list maintained by an NB-IoT network, wherein the NB-IoT network comprises the first NB-IoT node, the second NB-IoT node, and each remaining node of the one or more NB-IoT nodes; and attaching the priority bit to a front of a packet, wherein the packet comprises the mobile device address, a cell address, and a cyclic redundancy check field.

13. One or more non-transitory computer-readable media storing instructions that, when executed by a computing device comprising at least one processor, a communication interface, and memory, cause the computing device to:

monitor a wireless data connection corresponding to the computing device and a first narrow-band internet of things (NB-IoT) node;

generate, based on historical connection information of the computing device, a preferred connections list comprising one or more NB-IoT nodes;

update, while the wireless data connection is established, the preferred connections list by:

scoring each NB-IoT node of the one or more NB-IoT nodes, wherein the scoring is based on a direction of travel of the computing device;

modifying, based on the scoring, an order of priority of the one or more NB-IoT nodes; and repeating the scoring and the modifying the order of priority periodically while the wireless data connection is established;

determine, based on comparing a connection strength corresponding to the wireless data connection to a threshold value, whether or not the connection strength is below the threshold value;

generate, based on identifying that the connection strength is below the threshold value, a connection transfer request packet corresponding to real-time information of the computing device;

send, based on a preferred connections list, the connection transfer request packet to one or more NB-IoT nodes on the preferred connections list;

receive, based on sending the connection transfer request packet, a determination result from a second NB-IoT node of the one or more NB-IoT nodes, and in response:

if the determination result indicates that the second NB-IoT node will accept a connection transfer:

generate an acknowledgment packet configured to cause the connection transfer with the second NB-IoT node; and cause, based on the acknowledgment packet, the first NB-IoT node to transfer the wireless data connection to the second NB-IoT node, or if the determination result indicates that the second NB-IoT node will not accept the connection transfer:

updating the preferred connections list by removing the second NB-IoT node from the preferred connections list; and sending, after updating the preferred connections list and to one or more NB-IoT nodes on the updated preferred connections list, a second connection transfer request packet.

14. The one or more non-transitory computer-readable media of claim 13, wherein the connection transfer request packet comprises:

a priority bit corresponding to a priority of the computing device;

a mobile device address corresponding to the computing device;

a cell address, wherein the cell address is configured to serve as a return address for the determination result; and a cyclic redundancy check field, wherein the cyclic redundancy check field is configured to determine whether or not the connection transfer request packet includes an error.

15. The one or more non-transitory computer-readable media of claim 13, wherein the acknowledgment packet comprises:

an Acknowledgment bit, wherein the Acknowledgment bit indicates the determination result is a positive determination result;

a connection establishment request, wherein the connection establishment request is configured to request the connection with the second NB-IoT node; and an address corresponding to the second NB-IoT node.

16. The one or more non-transitory computer-readable media of claim 13, wherein generating the connection transfer request packet comprises:

generating a priority bit based on comparing a mobile device address corresponding to the computing device to a priority list maintained by an NB-IoT network, wherein the NB-IoT network comprises the first NB-IoT node, the second NB-IoT node, and each remaining node of the one or more NB-IoT nodes; and attaching the priority bit to a front of a packet, wherein the packet comprises the mobile device address, a cell address, and a cyclic redundancy check field.

17. The computing device of claim 1, wherein the instructions, when executed by the one or more processors, cause the computing device to perform the sending the connection transfer request packet to the one or more NB-IoT nodes on the preferred connections list by excluding, from a list of NB-IoT nodes capable of connecting to the computing device at the time of the sending, any NB-IoT nodes absent from the preferred connections list.

18. The method of claim 8, wherein the sending the connection transfer request packet to the one or more NB-IoT nodes on the preferred connections list comprises excluding, from a list of NB-IoT nodes capable of connecting to the computing device at the time of the sending, any NB-IoT nodes absent from the preferred connections list.

19. The one or more non-transitory computer-readable media of claim 13, wherein the instructions, when executed, cause the sending the connection transfer request packet to the one or more NB-IoT nodes on the preferred connections list by excluding, from a list of NB-IoT nodes capable of connecting to the computing device at the time of the sending, any NB-IoT nodes absent from the preferred connections list.

20. The computing device of claim 1, wherein the one or more NB-IoT nodes comprises a plurality of NB-IoT nodes and wherein the instructions, when executed by the one or more processors, further cause the computing device to send the connection transfer request packet to the one or more NB-IoT nodes on the preferred connections list by:

sending, before receiving the determination result from the second NB-IoT node, the connection transfer request packet to each NB-IoT node of the plurality of NB-IoT nodes.

* * * * *